United States Patent
Arens

Patent Number: 5,458,057
Date of Patent: Oct. 17, 1995

[54] APPARATUS FOR FACILITATING THE INSTALLATION OF A DIESET IN A RECIPROCATING PRESS

[76] Inventor: Cornelius G. Arens, 9000 Hubbell St., Detroit, Mich. 48228

[21] Appl. No.: 994,560

[22] Filed: Dec. 21, 1992

[51] Int. Cl.$^6$ ..................................................... B30B 15/06
[52] U.S. Cl. .................. 100/299 R; 72/446; 100/918; 483/28
[58] Field of Search .............................. 100/224, 229 R, 100/918; 72/446, 448, 452, 453.09; 483/28

[56] References Cited

U.S. PATENT DOCUMENTS

| | | | |
|---|---|---|---|
| 3,204,292 | 9/1965 | Schon | 100/918 X |
| 4,635,465 | 1/1987 | Ashelman, Jr. et al. | 72/448 |
| 4,682,401 | 7/1987 | Tadashi et al. | 483/28 X |
| 4,773,839 | 9/1988 | Case et al. | 100/918 X |

FOREIGN PATENT DOCUMENTS

| | | | |
|---|---|---|---|
| 844857 | 6/1970 | Canada | 72/448 |
| 2801998 | 7/1979 | Germany | 72/448 |
| 57-109533 | 7/1982 | Japan | 483/28 |
| 59-159300 | 9/1984 | Japan | 100/918 |
| 777110 | 6/1957 | United Kingdom | 100/918 |

*Primary Examiner*—Stephen F. Gerrity

[57] ABSTRACT

An apparatus and method for facilitating the installation of a dieset in a vertically reciprocating press which includes cooperating horizontal reciprocation guides to facilitate horizontal reciprocation of a dieset with translation of a continuous workpiece passing therethrough. The apparatus comprises a loading platform which is disposed in a plane substantially parallel to that defined by the uppermost surface of the reciprocating press platform. The loading platform includes an elevatable portion located centrally therein which is capable of elevating the dieset so as to achieve a proper alignment of the horizontal reciprocating guides of the dieset with cooperating horizontal reciprocating guides of the reciprocating press. In addition, the elevating platform features guides which establish a lateral alignment of cooperating reciprocating guides. An air cylinder is used to define the alternate elevations of the elevating platform. Spring operated lateral guides may be utilized to provide lateral alignment of the dieset with respect to the reciprocating press.

5 Claims, 4 Drawing Sheets

APPARATUS FOR FACILITATING THE INSTALLATION OF A DIESET IN A RECIPROCATING PRESS

BACKGROUND OF THE INVENTION

1. Field of the Invention

This invention relates to reciprocating presses and, more specifically, to the installation of a dieset therein including vertical and horizontal alignment capability which facilitates installation thereof.

2. Description of the Related Art

Presently die sets include horizontal laterally displaced parallel reciprocating guides; one pair disposed on the bottom of the lower die shoe and one pair disposed on the top of the upper die shoe. These guides cooperate with respective pair of guides disposed on the bed and ram of a vertically reciprocating press. In operation the guides disposed on the press and those disposed on the die set cooperate to produce a low friction horizontal reciprocation of the die set. The horizontal and vertical reciprocation of the die set and press are synchronized so that material flowing continuously through the die set may be cut virtually on-the-fly. Supporting the weight of the die set and transmitting the force of the press to the die set requires a rigid structural interconnection between the cooperating guides which continuing to require a low friction relation therebetween. As a result, parallelism and close tolerances between the cooperating guides are critical to proper system operation. Achieving alignment of the reciprocating guides on the die set with those of the press during installation of the die set is a difficult and time consuming process. Techniques presently used include an elevating table which may be positioned laterally with respect to the press by means of casters. Equipment guarding must be removed each time a die set change is made. The present invention may be prepared as an integral portion of the press or by means of retrofit and avoids the necessity to remove guarding to accomplish a die set change.

SUMMARY OF THE PRESENT INVENTION

The present invention is an apparatus and method for facilitating the installation of a dieset in a vertically reciprocating press which includes cooperating horizontal reciprocation guides to facilitate horizontal reciprocation of a dieset with translation of a continuous workpiece passing therethrough. The apparatus comprises a loading platform which is disposed in a plane substantially parallel to that defined by the uppermost surface of the reciprocating press platform. The loading platform includes an elevatable portion located centrally therein which is capable of elevating the dieset so as to achieve a proper alignment of the horizontal reciprocating guides of the dieset with cooperating horizontal reciprocating guides of the reciprocating press. In addition, the elevating platform features guides which establish a lateral alignment of cooperating reciprocating guides. An air cylinder or other elevating force means is used to define the alternate elevations of the elevating platform. Spring operated lateral guides may be utilized to provide lateral alignment of the dieset with respect to the reciprocating press.

These and other aspects of the present invention will become more readily apparent by reference to the following detailed description of the embodiments as shown in the drawings.

DETAILED DESCRIPTION OF THE PREFERRED EMBODIMENT

Figure 1:
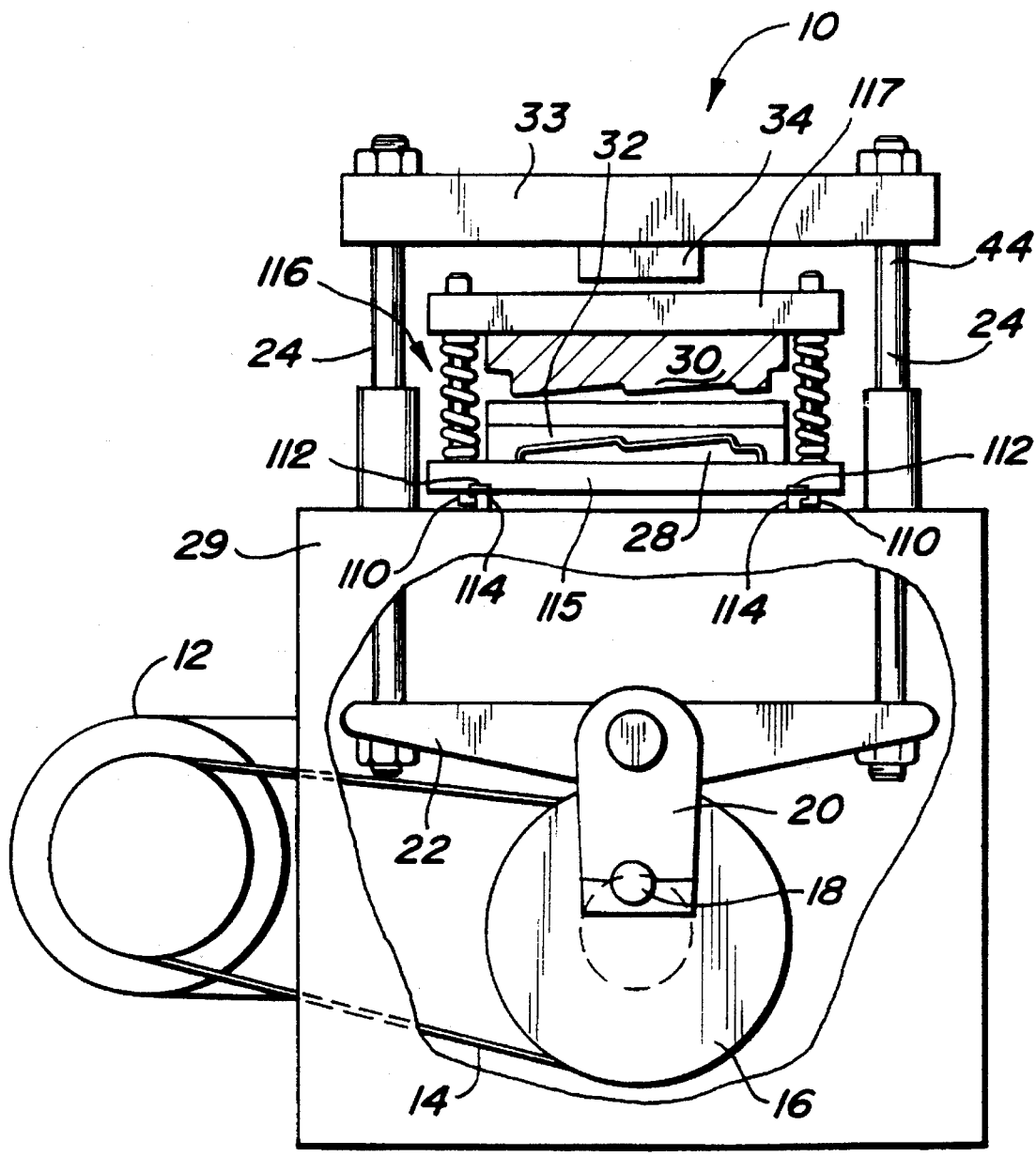
FIG. 1 is a front view of a reciprocating press which incorporates the features of the present invention.
Figure 2:
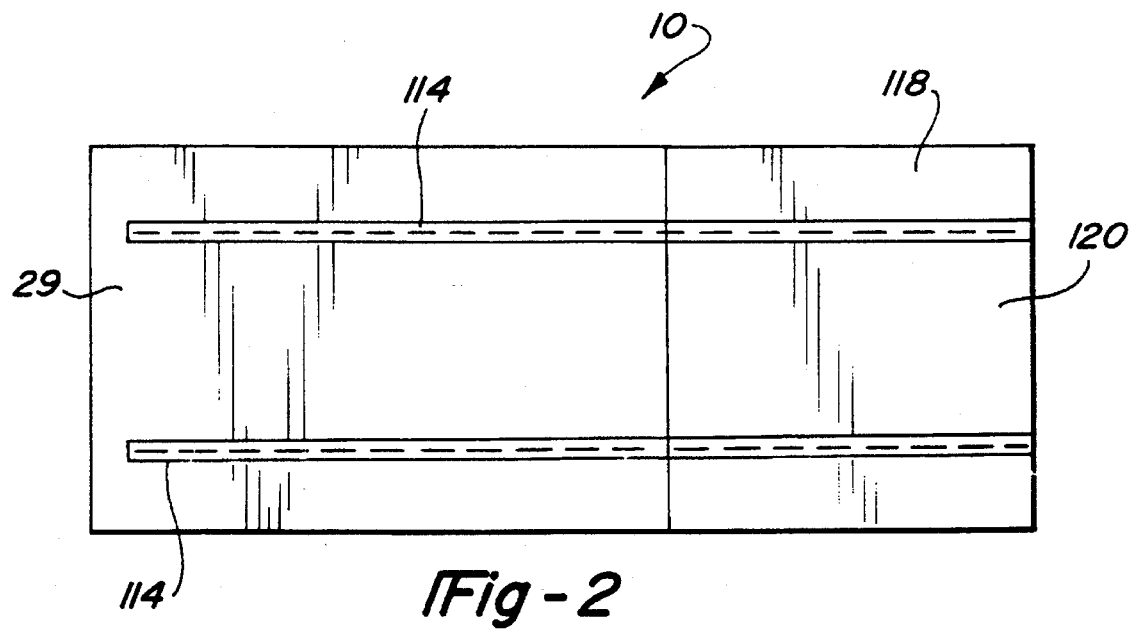
FIG. 2 is a plan view of a reciprocating press including a loading platform installed thereon.
Figure 3:
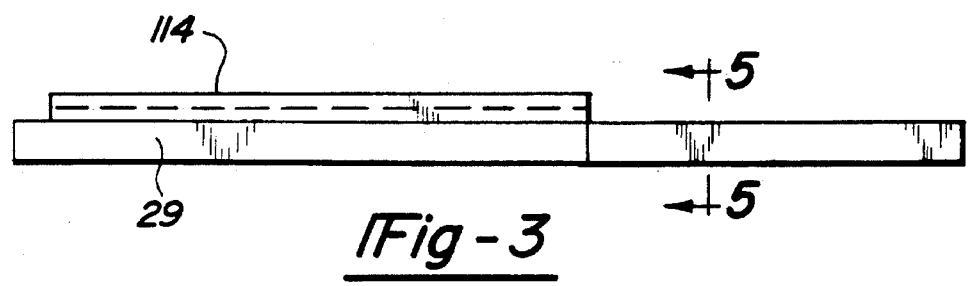
FIG. 3 is a side view of the lower platform of a reciprocating press including the loading platform of the present invention.
Figure 4:
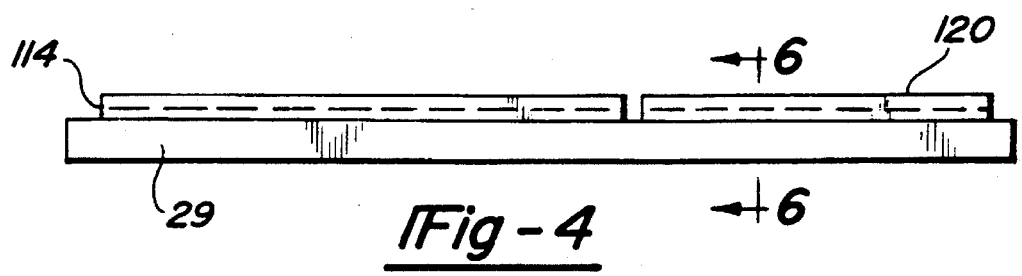
FIG. 4 is a side view of the lower platform of a reciprocating press including the loading platform of the present invention wherein an elevating platform is shown in elevating position.
Figure 5:
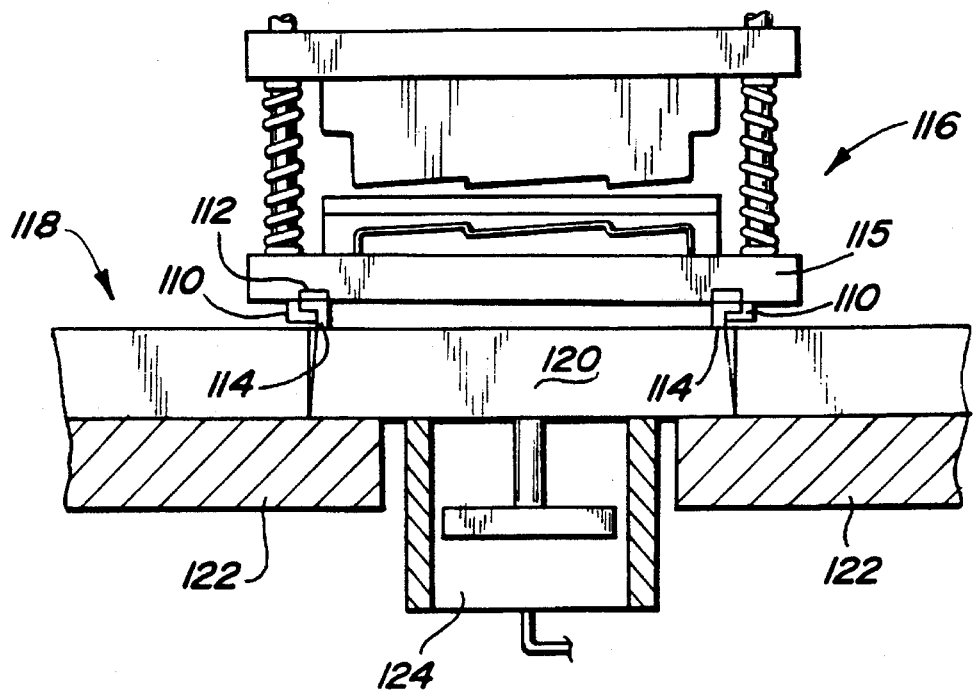
FIG. 5 is a cross section taken at lines 5—5 of FIG. 3.
Figure 6:
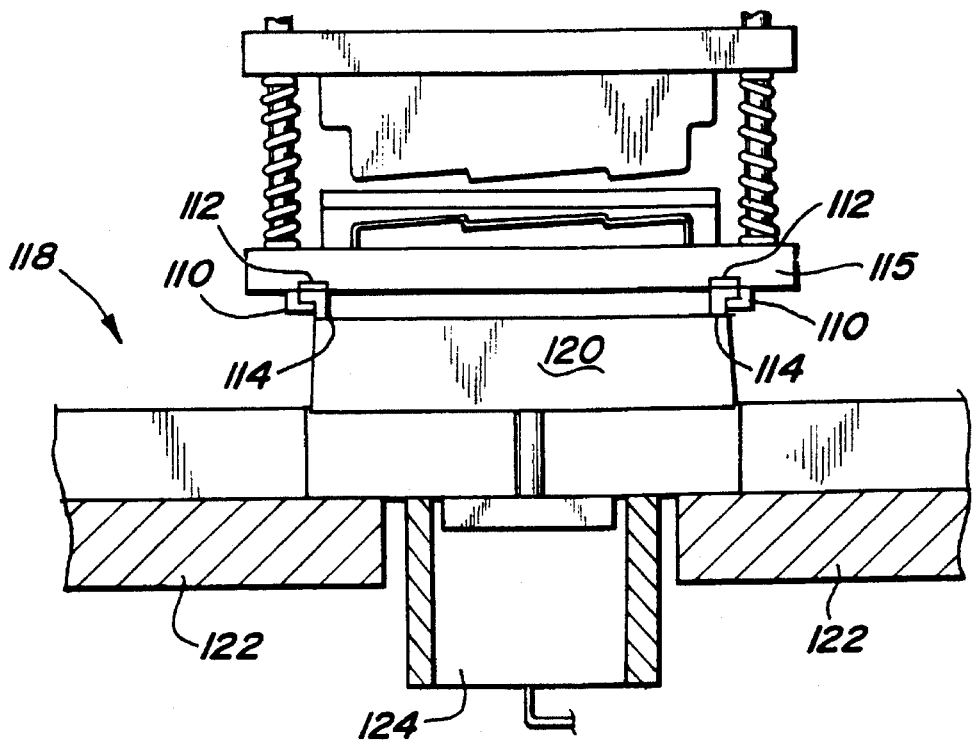
FIG. 6 is a cross section of FIG. 4 taken at line 6—6 thereof.

The present invention is a reciprocating press 10, as illustrated in FIG. 1, including a motor 12 connected by a drive belt 14 to a flywheel clutch brake assembly 16. The flywheel clutch brake assembly of the present invention is that practiced in the art for use in extracting energy from a rotating flywheel to accomplish a singular rotation of offset crank journal 18 to produce a single cycle of reciprocating press 10. Connecting rod 20 provides a mechanical conversion of rotating offset crank journal 18 to reciprocating platen 22. Primary draw bars 24 transmit the reciprocating motion of platen 22 to primary ram 33. Lower blade 28 and upper blade 30 function to shear material placed therebetween. Stripper 32 prevents the material from following the reciprocating upper blade 30 by offering a mechanical stop to motion of the material in that direction. Primary base 29 serves as a structurally rigid mounting surface for securing horizontal reciprocating guide 114. Wear plate 112 offers a low friction sliding surface on which horizontal reciprocating guide 114 slides. Cooperating horizontal reciprocating guide 110 is secured to the lower portion 115 of dieset 116. Bumper block 34 engages the upper shoe 117 of dieset 116 to transmit reciprocating force of press 10. FIG. 2 illustrates a plan view of the reciprocating press 10 having the primary ram 33 and dieset 116 removed illustrating fixed horizontal reciprocating guides 110. Loading platform 118 extends horizontally in common planar elevation with primary base 29 as shown in FIG. 3. Portion 120 of loading platform 118 is selectively elevatable to align cooperating horizontal reciprocating guides 110 with corresponding reciprocating guides of a die set (not shown). As shown in FIG. 5, loading platform 118 features a dieset 116 disposed thereon being prepared for installation within a reciprocating press (not shown). It may be noted that elevating platform 120 features an uppermost surface lying in a common plane with the uppermost surface defined by loading platform 118. In the preferred embodiment of the present invention, alignment thereof is accomplished by physical engagement of elevating platform 120 with reference base 122. Dieset 116 may be placed upon loading platform 1 18 and positioned laterally by sliding the dieset 116 thereacross without experiencing interference due to the gaps between the respective structures of elevating platform 120 and loading platform 118. It may be noted that elevating platform 120 features a lateral width proximate the lateral dimension between the cooperating horizontal reciprocating guides 110, 110 disposed on lower shoe 115 of dieset 116. Cylinder 124 provides elevating force to raise dieset 116, as shown in FIG. 6, in such a manner that cooperating horizontal reciprocating guides 114 align with wear plates 112 and horizontal reciprocating guide 110. Lateral alignment of dieset 116 is facilitated by means of tapered elevating platform 120. At this point, dieset 116 may be slid forward such that cooperating reciprocating guides 110, 114 engage and therefore define the position of dieset 116 within reciprocating press 10. Upon completion of such installation, air pressure to cylinder 124 may be relieved, allowing the elevating platform 120 to retract to a position such that the upper most surface thereof defines a plane common with that defined by the uppermost surface of platform 118. In this manner a reciprocating die may be placed in a reciprocating press such that alignment of the horizontal reciprocating guides is facilitated increasing the die change speed and consequently reducing down time.

Figure 7:
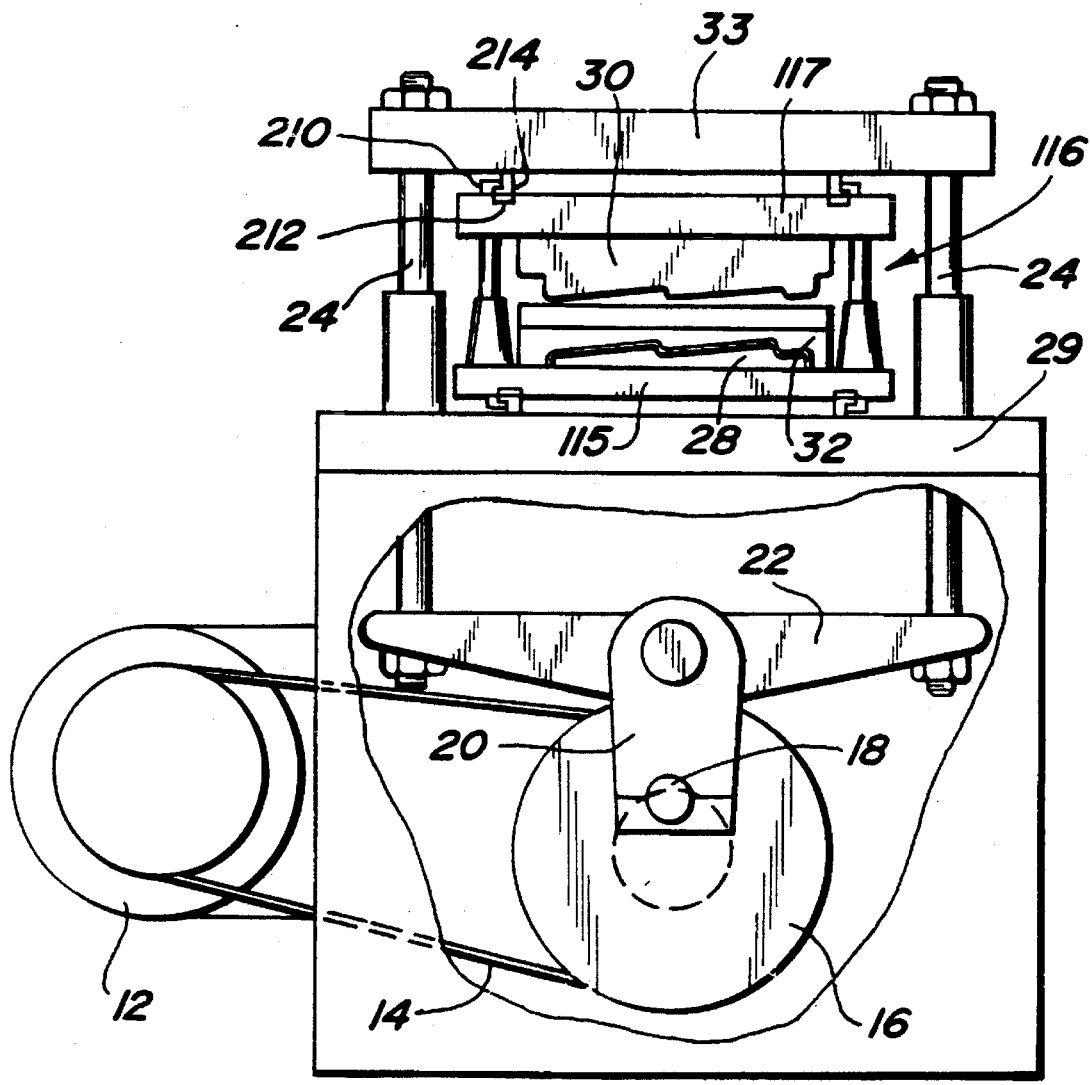
FIG. 7 is a front view of a reciprocating press which incorporates a modified press including the features of the present invention.

Another embodiment of the present invention which is illustrated in FIG. 7, including a press 10 features a second set of cooperating horizontal reciprocating guides 210 and 214 and wear plates 212. In all other respects, press 10 of FIG. 7 is identical with press 10 of FIG. 1. The additional pairs of guides 210, 214 introduce another variable which must be dealt with during installation of die set 116; that is coordinating the height of primary ram 33 and guides 214 with the normal height of guides 210. The present invention accomplishes alignment thereof by means of a press height setting accomplished by advancing the primary ram 33 to a predetermined position and holding. Such a position may be programmed to match a normal die height or individually programmed to advance to a height which has been determined for each die set.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A vertically reciprocating press including a press bed, a primary ram reciprocable with respect to said press bed, a first pair of parallel laterally displaced guides disposed on said press bed for cooperating with guides disposed on a die set for use therein to facilitate reciprocation; the invention comprising:

a platform extending coplanar to said press bed in a direction parallel to said guides;

a portion of said platform being selectively elevatable from a first position substantially coplanar with an uppermost surface of said platform to a second position in which reciprocating guides disposed on said press and guides disposed on a die set disposed on said platform are aligned in a common elevation; and said portion of said platform having an upwardly tapered cross sectional profile and featuring a lateral width proximate a lateral dimension between said guides disposed on said die set wherein said portion of said platform upon elevation thereof engages said reciprocating guides facilitating lateral alignment thereof.

2. The press of claim 1 wherein said portion of said platform being selectively elevatable is selectively elevatable by fluid pressure means.

3. The press of claim 2 wherein said fluid pressure means is compressed air.

4. The invention of claim 1 wherein said primary ram includes a second pair of parallel laterally disposed guides cooperating with cooperating guides disposed on an upper shoe of said die set and said primary ram may be selectively positioned at an elevation which facilitates alignment of said second pair of parallel laterally disposed reciprocating guides and said cooperating guides disposed on said upper shoe of said die set.

5. A vertically reciprocating press including a press bed, a primary ram reciprocable with respect to said press bed, a first pair of parallel laterally displaced guides disposed on said press bed; and a second pair of parallel laterally disposed guides; said first and second guides may be used for cooperative engagement with guides respectively disposed on a lower and upper shoe of a die set for use therein to facilitate reciprocation, the invention comprising:

a platform extending coplanar to said press bed in a direction parallel to said guides;

a portion of said platform being selectively elevatable from a first position substantially coplanar with an uppermost surface of said platform to a second position in which said first guides disposed on said press and guides disposed on said platform are aligned in a common elevation;

said primary ram may be selectively positioned at an elevation which facilitates alignment of said second pair of guides; and wherein said portion of said platform has an upwardly tapered cross sectional profile and features a lateral width proximate a lateral dimension between said guides disposed on said die set wherein said portion of said platform upon elevation thereof engages said reciprocating guides facilitating lateral alignment thereof.

* * * * *